(12) United States Patent
Chen et al.

(10) Patent No.: US 10,951,145 B2
(45) Date of Patent: Mar. 16, 2021

(54) MOTOR CONTROL METHOD AND DEVICE

(71) Applicant: DELTA ELECTRONICS, INC., Taoyuan (TW)

(72) Inventors: Chin-Hao Chen, Taoyuan (TW); Cheng-Chung Li, Taoyuan (TW); Yu-Min Meng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/555,815

(22) Filed: Aug. 29, 2019

(65) Prior Publication Data

US 2020/0220486 A1    Jul. 9, 2020

(30) Foreign Application Priority Data

Jan. 8, 2019   (CN) .......................... 201910016744.5

(51) Int. Cl.
| | |
|---|---|
| *H02P 1/00* | (2006.01) |
| *H02P 21/02* | (2006.01) |
| *H02P 21/18* | (2016.01) |
| *H02P 27/12* | (2006.01) |
| *H02P 21/34* | (2016.01) |
| *H02P 21/22* | (2016.01) |

(52) U.S. Cl.
CPC .............. *H02P 21/02* (2013.01); *H02P 21/18* (2016.02); *H02P 21/22* (2016.02); *H02P 21/34* (2016.02); *H02P 27/12* (2013.01)

(58) Field of Classification Search
CPC .......... H02P 21/34; H02P 21/22; H02P 21/02; H02P 1/04; H02P 1/16; H02P 6/20; H02P 25/03
See application file for complete search history.

(56) References Cited

U.S. PATENT DOCUMENTS

2018/0187681 A1* 7/2018 Sakai ................. B60H 1/00464

FOREIGN PATENT DOCUMENTS

| CN | 102025312 B | 1/2014 |
|---|---|---|
| TW | 571506 B | 1/2004 |
| TW | 200531426 A | 9/2005 |
| TW | 201130219 A | 9/2011 |

\* cited by examiner

*Primary Examiner* — Karen Masih
(74) *Attorney, Agent, or Firm* — Muncy, Geissler, Olds & Lowe, P.C.

(57) ABSTRACT

A motor control method adapted for use in the startup process of a sensorless brushless DC (BLDC) motor includes the following steps. A phase voltage signal and a driving voltage signal are generated according to the startup current signal with a first predetermined value and a phase current signal. A driving current signal is generated according to the driving voltage signal to drive the BLDC to rotate. The driving current signal is sensed to generate the corresponding phase current signal. The load state of the shaft end of the BLDC is determined according to the phase voltage signal with the change of the corresponding phase current signal and the startup current signal. The magnitude of the startup current signal is adaptively adjusted according to the load state of the shaft end and/or according to the electric rotation angular velocity and the torque demand of the BLDC motor.

18 Claims, 11 Drawing Sheets

MOTOR CONTROL METHOD AND DEVICE

CROSS REFERENCE TO RELATED APPLICATIONS

This application claims priority of China Patent Application No. 201910016744.5, filed on Jan. 8, 2019, the entirety of which is incorporated by reference herein.

BACKGROUND OF THE DISCLOSURE

Field of the Disclosure

The present disclosure relates to a controlling method and device, and in particular it relates to a motor control method and device adapted for the startup process of a sensorless brushless DC (BLDC) motor.

Description of the Related Art

Since the rotor of the brushless DC (BLDC) motor has the property of built-in magnetic field to make performance and efficiency thereof are superior to other motors, the BLDC motor is widely used in various fields. For good BLDC motor control, the rotor position must be obtained for use in the correct control magnetic field. The current methods for obtaining the rotor position of the BLDC motor are mainly divided into two methods of a sensor (encoder) and a sensorless (electric estimation). In applications where performance requirements for speed and position control are low or environmental conditions are poor, most methods using sensorless driving technology as obtaining the rotor position of the BLDC motor to control the BLDC motor are used.

The current sensorless driving technology usually needs to apply an open-loop current or voltage to control the motor to a certain speed, the rotor position of the motor is detected according to a sensorless algorithm, so that the motor enters a closed-loop control. However, since the load condition of the rotor may not be estimated when the open-loop current or voltage control, a large current is mostly applied to drive the motor, so as to avoid a startup failure of the motor. Such large current results in excess power loss under a light load. Therefore, the design of the startup control of the motor still needs improvement.

BRIEF SUMMARY OF THE DISCLOSURE

The present disclosure is to provide a motor control method and device, thereby decreasing the power loss of the motor in a startup control period.

The present disclosure provides a motor control method adapted for the startup process of a brushless DC (BLDC) motor. The motor control method includes the following steps. A phase voltage signal and a driving voltage signal are generated according to the startup current signal with a first predetermined value and a phase current signal. A driving current signal is generated according to the driving voltage signal to drive the BLDC motor to rotate, wherein the first predetermined value causes the BLDC motor to maintain a normal rotation. The driving current signal is sensed to generate the corresponding phase current signal. The load state of the shaft end of the BLDC motor is determined according to the phase voltage signal with the change of the corresponding phase current signal and the startup current signal. The magnitude of the startup current signal is adaptively adjusted according to the load state of the shaft end and/or according to the electric rotation angular velocity and the torque demand of the BLDC motor.

In addition, the present disclosure provides a motor control device, which includes a driving unit, an inverter, a sensing unit and a control unit. The driving unit generates a phase voltage signal and a driving voltage signal according to a startup current with a first predetermined value and a phase current signal. The inverter generates a driving current signal according to the driving voltage signal to drive the BLDC motor to rotate, wherein the first predetermined value causes the BLDC motor to maintain a normal rotation. The sensing unit senses the driving current signal of the inverter to generate the corresponding phase current signal. The control unit provides the startup current signal, determines the load state of the shaft end of the BLDC motor according to the phase voltage signal with the change of the corresponding phase current signal and the startup current signal, and adaptively adjusts the magnitude of the startup current signal according to the load state of the shaft end and/or according to the electric rotation angular velocity and the torque demand of the BLDC motor.

According to the controlling method and device, the magnitude of the startup current signal is adaptively adjusted according to the load state of the shaft end and/or according to the electric rotation angular velocity and the torque demand of the BLDC motor. Therefore, the situation of increasing the power loss resulted from providing the constant large startup current to drive the BLDC motor may be avoided, thereby effectively decreasing the power loss of the BLDC motor in the startup process period.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

In each of the following embodiments, the same reference number represents the same or similar element or component.

Figure 1A:
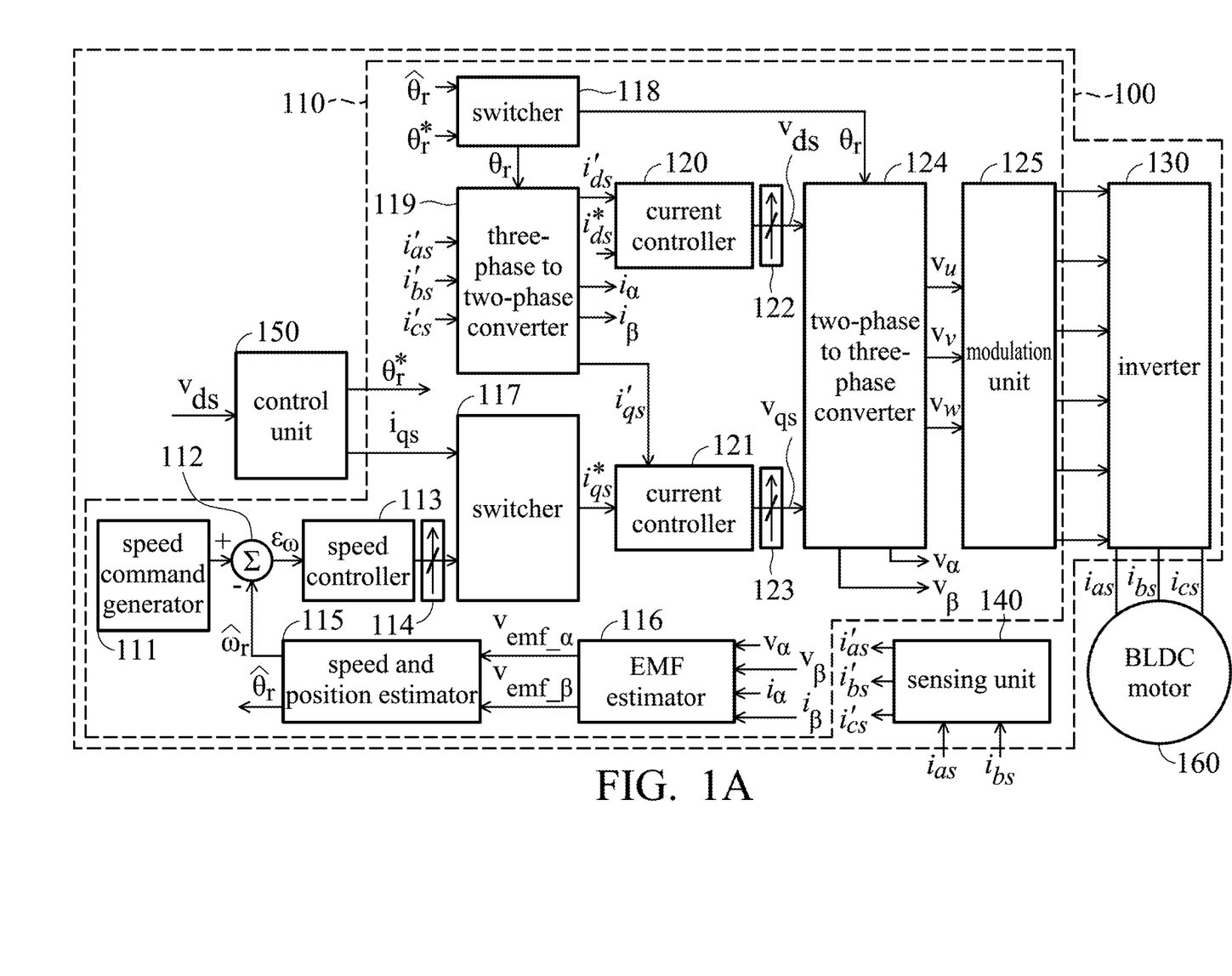
FIG. 1A shows a schematic view of a motor control device according to an embodiment of the present disclosure.

FIG. 1A shows a schematic view of a motor control device according to an embodiment of the present disclosure Please refer to FIG. 1A, the motor control device 100 of the embodiment is adapted for the startup process of a sensorless brushless DC (BLDC) motor 160. In other words, the motor control device 100 does not include the related circuit of the position sensor. In the controlling circuit of the motor with the sensor, the position sensor is installed on the motor. In some embodiments, the BLDC motor 160 is adapted for household appliances, such as a drum washing machine, a vertical washing machine, a dryer, etc., but is not limited thereto. In the embodiment, the motor control device 100 includes a driving unit 110, an inverter 130, a sensing unit 140 and a control unit 150.

The driving unit 110 generates a d-axis voltage signal $v_{ds}$ and a q-axis voltage signal $v_{qs}$ according to the startup current signal iqs and a phase current signal and generate a driving current signal according to the d-axis voltage signal $v_{ds}$ and the q-axis voltage signal $v_{qs}$.

Specifically, In an initial stage (t=0) of driving the BLDC motor 160, the driving unit 110 receives the startup current signal iqs with a first predetermined value and d-axis current signal $i^*_{ds}$ with a current value of zero to generate the d-axis voltage signal $v_{ds}$ and the q-axis voltage signal $v_{qs}$ and further generate the initial driving voltage signal. The first predetermined value may be adjusted according to actual requirements.

In some embodiments, the first predetermined value causes the BLDC motor 160 to maintain a normal rotation, and an effective value (square root) of the first predetermined value is, for example, 4 A (amperes). In the embodiment, the startup current signal iqs, for example, a q-axis current for driving the BLDC motor 160.

The inverter 130 generating a driving current signal (i.e., three-phase current signals ias, ibs and ics) according to the driving voltage signal to drive the BLDC motor 160 to rotate. Since the startup current signal iqs has the first predetermined value to cause the inverter 130 to generate a sufficient drive current signal in the initial stage, the BLDC motor 160 can be started at the initial stage.

The sensing unit 140 is coupled to an output terminal of the inverter 130. The sensing unit 140 senses the driving current signal (such as at least two of the three-phase current signals ias, ibs and ics) of the inverter 130 to generate the phase current signal (i.e., $i_{as}'$, $i_{bs}'$, and $i_{cs}'$). The phase current signal is transmitted to the driving unit 110, so that the driving unit 110 generates d-axis voltage signal $v_{ds}$ and q-axis voltage signal $v_{qs}$.

The control unit 150 is coupled to the driving unit 110 and provides the startup current signal iqs to driving unit 110. The control unit 150 determines the load state of the shaft end of the BLDC motor 160 according to the d-axis voltage signal $v_{ds}$ with the change of the phase current signal generated by the sensing unit 140 and the startup current signal iqs. Then, the control unit 150 adaptively adjusting the magnitude of the startup current signal iqs for providing to the driving unit 110 according to the load state of the shaft end and/or according to the electric rotation angular velocity and the torque demand of the BLDC motor 160. The load state of the shaft end includes, for example, light load, middle load and heavy load. In addition, the electric rotation angular velocity of the BLDC motor 160 may be obtained by internal digital information of the control unit 150.

Specifically, in the initial stage, the driving unit 110 receives the d-axis current command signal with the current value of zero (i.e., $i_{ds}^*=0$) and the startup current signal iqs with the first predetermined value provided by the control unit 150. Accordingly, the driving unit 110 generates d-axis voltage signal $v_{ds}$ and q-axis voltage signal $v_{qs}$ and further generates the corresponding driving current signal for driving the BLDC motor 160. Then, the sensing unit 140 senses the driving current signal required for the initial operation of the BLDC motor 160 to the corresponding phase current signal, and the phase current signal is transmitted to the driving unit. The driving unit 110 correspondingly adjusts d-axis voltage signal $v_{ds}$ and q-axis voltage signal $v_{qs}$ according to the phase current signal generated by the sensing unit 140. At this time, the control unit 150 may determine the load state of the shaft end of the BLDC motor 160 according to the adjusted d-axis voltage signal $v_{ds}$. That is, the control unit 150 may determine that the load state of the BLDC motor 160 is light load, middle load or heavy load. Afterward, the control unit 150 may adaptively adjust the magnitude of the startup current signal $i_{qs}$ for providing to the driving unit 110 according to the load state of the shaft end and/or according to the electric rotation angular velocity and the torque demand of the BLDC motor 160. Further, if the load state of the BLDC motor 160 is light load, the control unit 150 may decrease the provided startup current signal $i_{qs}$ without continuing to provide the startup current signal $i_{qs}$ with the first predetermined value. Therefore, the power consumption required for initially driving the motor may be decreased.

In some embodiments, as shown in FIG. 1A, the driving unit 110 includes a speed command generator 111, a subtractor 112, a speed controller 113, a limiter 114, a speed and position estimator 115, and a counter electromotive force (EMF) estimator 116, a switcher 117, a switcher 118, a three-phase to two-phase converter 119, a current controller 120, a current controller 121, a limiter 122, a limiter 123, a two-phase to three-phase converter 124 and a modulation unit 125, but the present disclosure is not limited thereto.

The speed command generator 111 generates an angular velocity command. The subtractor 112 subtracts the angular velocity $\hat{\omega}_r$ from the angular velocity command generated by the speed command generator 111 to obtain an angular velocity error $\varepsilon_\omega$). The speed controller 113 is connected to the subtractor 112, receives the angular velocity error $\varepsilon_\omega$, and generates a current signal according to the angular velocity error $\varepsilon_\omega$. The limiter 114 is connected to the speed controller 113, and receives and limits the current signal generated by the speed controller 113. The speed and position estimator 115 is connected to the subtractor 112, and receives counter EMF voltages $v_{emf\_\alpha}$ and $v_{emf\_\beta}$ to generate an angular velocity $\hat{\omega}_r$ and an electric angle $\hat{\theta}_r$. The counter EMF estimator 116 is connected to the speed and position estimator 115, and receives static axis voltages $v_\alpha$ and $v_\beta$ and static axis currents $i_\alpha$ and $i_\beta$ to generate the counter EMF voltages $v_{emf\_\alpha}$ and $v_{emf\_\beta}$.

The switcher 117 is connected to the limiter 114 and the control unit 150, receives the current signal generated by the speed controller 113 and the startup current signal $i_{qs}$ generated by the control unit 150, and selects the current signal generated by the speed controller 113 and the startup current signal $i_{qs}$ generated by the control unit 150 to output a current signal $i_{qs}*$. In the embodiment, in an open-loop control mode, the switcher 117 selects the startup current signal $i_{qs}$ generated by the control unit 150 to output the current signal $i_{qs}*$. In a closed-loop mode, the switcher 117 selects the current signal generated by the speed controller 113 to output the current signal $i_{qs}*$.

The switcher 118 is connected to the speed and position estimator 115 and the control unit 150, and receives the electric angle $\hat{\theta}_r$ generated by the speed and position estimator 115 and the electric angle $\theta_r*$ generated by the control unit 150 to output an electric angle $\theta_r$. In the embodiment, in the open-loop control mode, the switcher 118 selects the electric angle $\theta_r*$ generated by the control unit 150 to output the electric angle $\theta_r$. In a closed-loop mode, the switcher 118 selects the electric angle $\theta_r$ generated by the speed and position estimator 115 to output the electric angle $\theta_r$.

The three-phase to two-phase converter 119 is connected to the sensing unit 140, counter EMF estimator 116 and switcher 118 and receives the phase current signals $i'_{as}$, $i'_{bs}$ and $i'_{cs}$ and the electric angle $\theta_r$. The three-phase to two-phase converter 119 converts the phase current signals $i'_{as}$, $i'_{bs}$ and $i'_{cs}$ to two-phase static axis currents $i_{as}'$ and $i'_{qs}$ and then converts the two-phase static axis currents $i_\alpha$ and $i_\beta$ to two-phase synchronous axis currents $i_{ds}'$, and $i'_{qs}$. The current controller 120 is connected to the three-phase to two-phase converter 119 and receives the synchronous axis current $i_{ds}'$ and the current $i_{ds}*$, to generate a synchronous axis voltage. The current controller 121 is connected to the three-phase to two-phase converter 119 and receives the synchronous axis current $i_{qs}'$ and the current $i_{qs}*$ to generate a synchronous axis voltage. In the embodiment, the current controller 120 and the current controller 121 are respectively a proportional-Integral (PI) controller.

The limiter 122 is connected to the current controller 120 and limits the synchronous axis voltage generated by current controller 120 to generate the synchronous axis d-axis voltage signal $v_{ds}$. The limiter 123 is connected to the current controller 121 and limits the synchronous axis voltage generated by current controller 121 to generate the synchronous axis d-axis voltage signal $v_{qs}$.

The two-phase to three-phase converter 124 is connected to the limiter 122, the limiter 123, the counter EMF estimator 116 and the switcher 118 and receives the synchronous axis d-axis voltage signal $v_{ds}$, the synchronous axis q-axis voltage signal $v_{qs}$ and the electric angle $\theta_r$. The two-phase to three-phase converter 124 converts the synchronous axis d-axis voltage signal $v_{ds}$ and the synchronous axis d-axis voltage signal $v_{qs}$ to the static axis voltage $v_\alpha$ and the static axis voltage $v_\beta$ and then converts the static axis voltage $v_\alpha$ and the static axis voltage $v_\beta$ to three-phase voltages $v_u$, $v_v$ and $v_w$. The modulation unit 125 is connected to two-phase to three-phase converter 124, receives the three-phase voltages $v_u$, $v_v$ and $v_w$ and performs the pulse width modulation for the three-phase voltages $v_u$, $v_v$ and $v_w$ to generate the driving voltage signal with pulse width modulation voltage to the inverter 130.

Figure 1B:
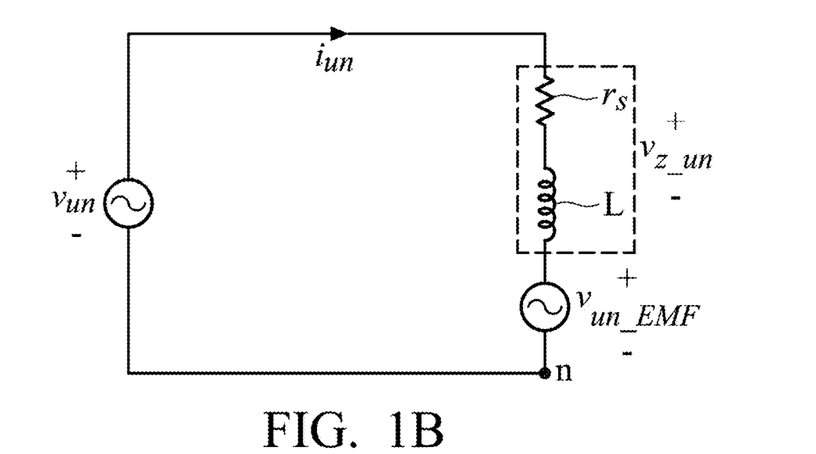
FIG. 1B shows a schematic view of a single-phase equivalent circuit of the BLDC motor according to an embodiment of the present disclosure.
Figure 1C:
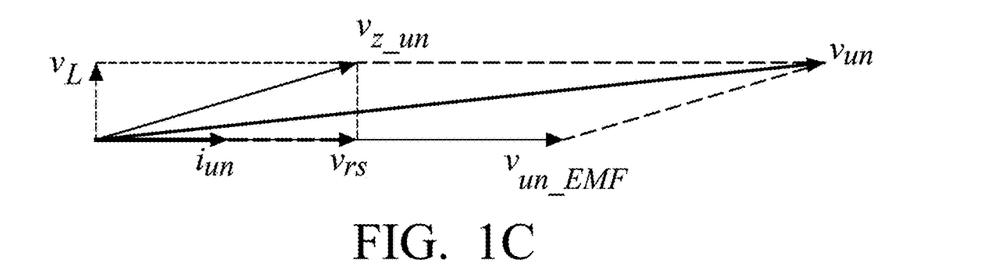
FIG. 1C shows a schematic view of a vector analysis of the single-phase equivalent circuit of the BLDC motor according to an embodiment of the present disclosure.
Figure 1D:
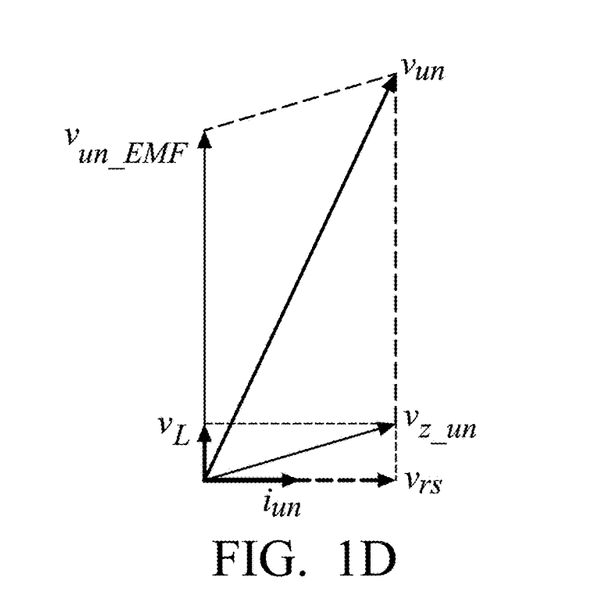
FIG. 1D shows a schematic view of a vector analysis of the single-phase equivalent circuit of the BLDC motor according to another embodiment of the present disclosure.

FIG. 1B shows a schematic view of a single-phase equivalent circuit of the BLDC motor according to an embodiment of the present disclosure. FIG. 1C shows a schematic view of a vector analysis of the single-phase equivalent circuit of the BLDC motor according to an embodiment of the present disclosure. FIG. 1D shows a schematic view of a vector analysis of the single-phase equivalent circuit of the BLDC motor according to another embodiment of the present disclosure. Please refer to FIGS. 1B, 1C and 1D, $v_{an}$ is the phase voltage, $i_{un}$ is the phase current, $v_{rs}$ is a voltage of the internal resistor $r_s$ of the BLDC motor 160, $v_L$ is a voltage of the internal inductor L of the BLDC motor 160, $v_{un\_EMF}$ is the counter EMF voltage, $v_{z\_un}$ is an impedance voltage of the BLDC motor 160, i.e., a vector sum of $v_{rs}$ and $v_L$.

An output mechanical power of the BLDC motor 160 is as shown in the following formula (1):

$$P_m = \omega_m \cdot T_e, \qquad (1)$$

wherein $P_m$ is the output mechanical power of the BLDC motor 160, $\omega_m$ is the angular velocity, $T_e$ is an output torque of the BLDC motor 160, which is defined according to the load condition of the rotor shaft end of the BLDC motor 160 when the speed of the BLDC motor 160 is maintained. When the load of the shaft end of the BLDC motor 160 is increased, the torque $T_e$ of the BLDC motor 160 may also be increased to maintain the constant speed of the BLDC motor 160, so that the mechanical power of the BLDC motor 160 is increased.

In addition, an electric input power of the BLDC motor 160 is as shown in the following formula (2):

$$P_e = 3 \cdot v_{un} \cdot i_{un} \cdot \cos\theta_2 \cong 3 \cdot v_{un\_EMF} \cdot i_{un} \cdot \cos\theta_1, \qquad (2)$$

wherein $P_e$ is proportional to the mechanical output power of the BLDC motor 160, "3" is three-phase, $v_{un\_EMF}$ is the counter EMF voltage, $i_{un}$ is the phase current, $\theta_1$ is an included angle between the counter EMF voltage $v_{un\_EMF}$ and the phase current $i_{un}$, $v_{un}$ is the phase voltage, $\theta_2$ is an included angle between the phase voltage $v_{un}$ and the phase current $i_{un}$. A relationship between the mechanical output power and the electric input power of the BLDC motor 160 is as the following formula (3):

$$P_m = P_e \cdot \eta, \qquad (3)$$

Wherein $\eta$ is the efficiency of the BLDC motor 160. In addition, formula (2) used in cases where there is a light load or a heavy load on the BLDC motor 160, the relative relationship between the voltage component and the current component can be as shown in FIG. 1C and FIG. 1D, respectively. FIG. 1C corresponds to the relative relationship between the voltage component and the current component in case there is a heavy load on the BLDC motor 160. FIG. 1D corresponds to the relative relationship between the voltage component and the current component in case there is a light load on the BLDC motor 160. That is, according to FIG. 1C and FIG. 1D, when the phase current $i_{un}$ maintains a fixed value, the magnitude and phase of the phase voltage $v_{un}$ may change depending on the increase of the output mechanical power (i.e., the load value of the shaft end of the motor) of the BLDC motor 160. The included angle between the phase current $i_{un}$ and phase voltage $v_{un}$ in especially reflects clearly the load property of the shaft end of the BLDC motor 160. That is, the mechanical output power of the BLDC motor 160 increases due to the increase of the load of the shaft end. The load property of the shaft end of the BLDC motor 160 may also be observed from the electric input power of the BLDC motor 160.

Briefly, in the startup stage of the BLDC motor 160, if a fixed driving current (for example, fixed $i_{un}$) is first provided to start the BLDC motor 160, the mechanical power of the BLDC motor 160 may be sensed to obtain the load property of the shaft end of the BLDC motor 160 (such as heavy load or light load). After the load property is obtained, the supplied driving current can be correspondingly adjusted according to the load property.

Figure 1E:
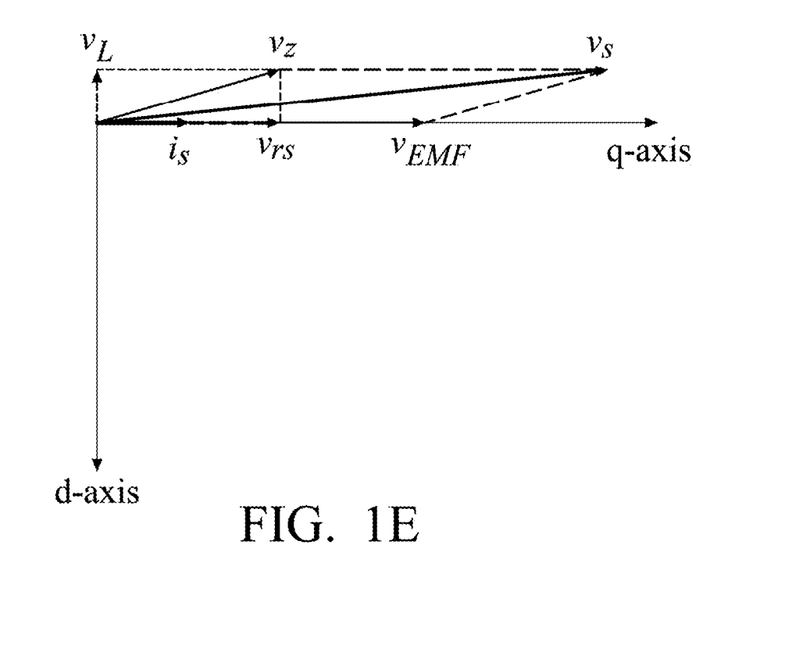
FIG. 1E shows a schematic view of a vector analysis of an output voltage of an inverter on d-q axes according to an embodiment of the present disclosure.
Figure 1F:
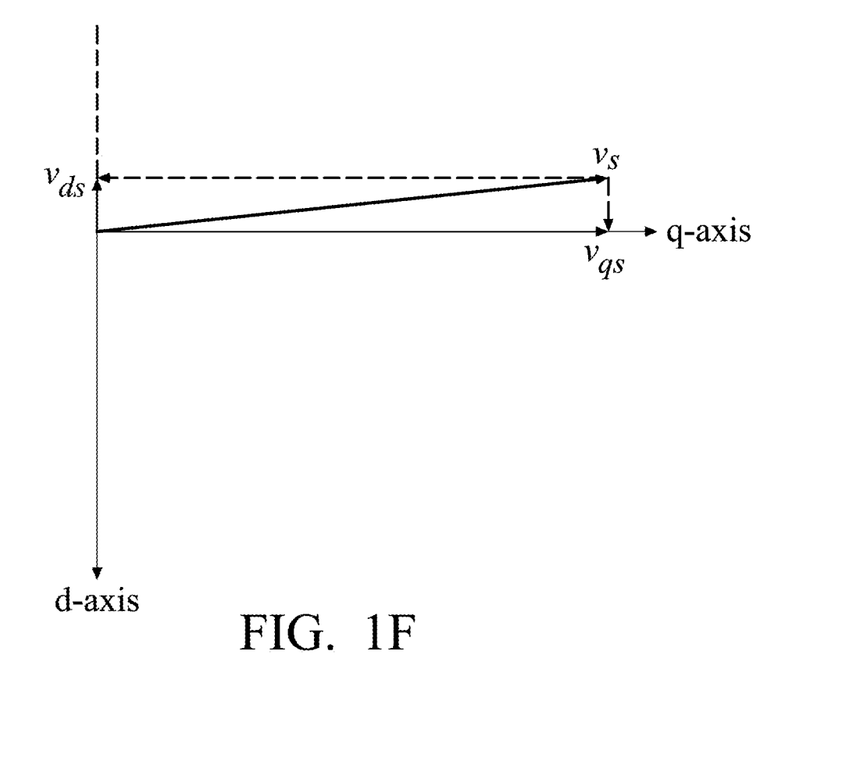
FIG. 1F shows a schematic view of a vector analysis of the output voltage of the inverter on the d-q axes function according to another embodiment of the present disclosure.
Figure 1G:
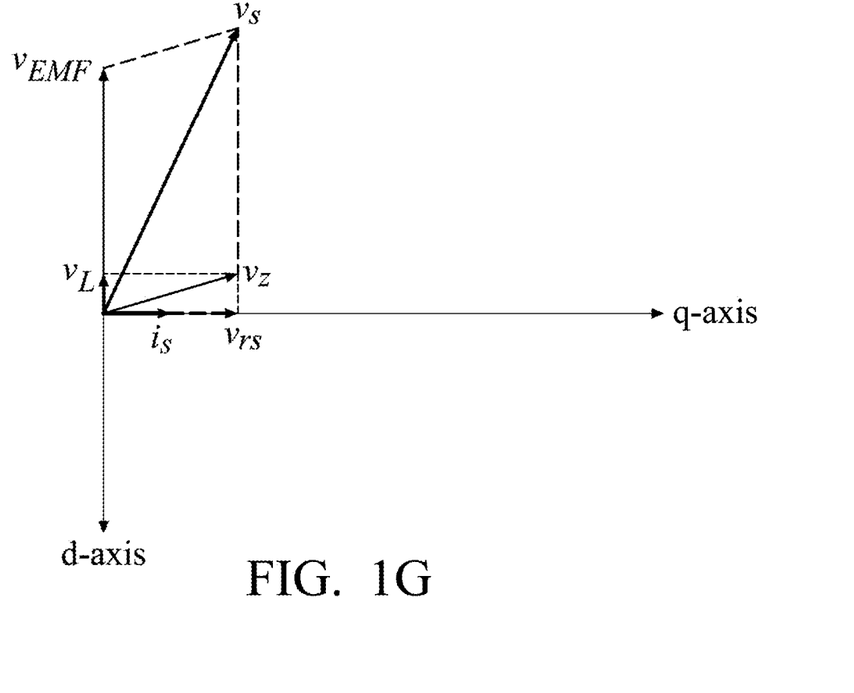
FIG. 1G shows a schematic view of a vector analysis of the output voltage of the inverter on the d-q axes function according to another embodiment of the present disclosure.
Figure 1H:
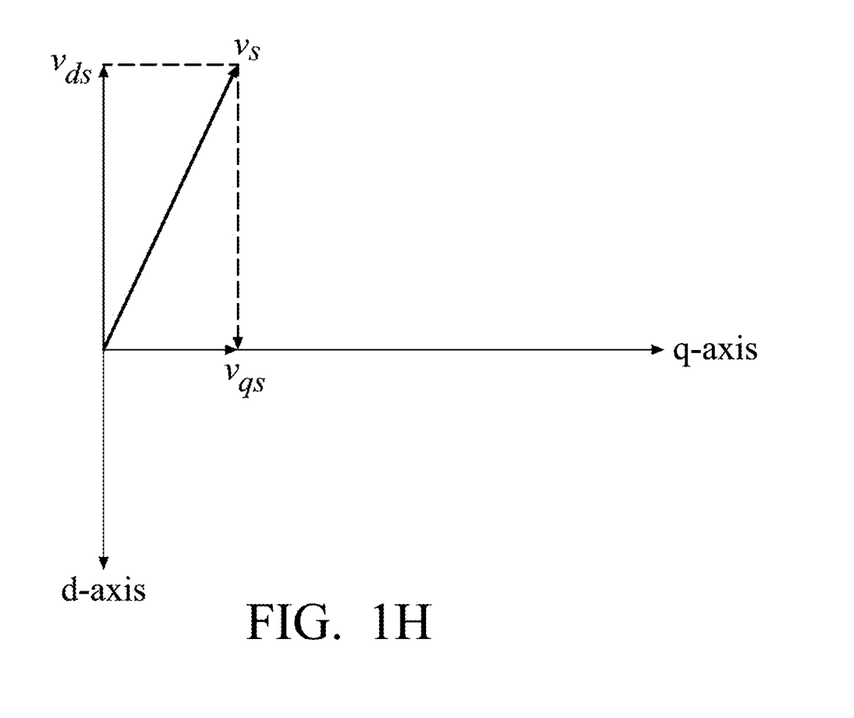
FIG. 1H shows a schematic view of a vector analysis of the output voltage of the inverter on the d-q axes function according to another embodiment of the present disclosure.

FIG. 1E shows a schematic view of a vector analysis of an output voltage of an inverter on d-q axes according to an embodiment of the present disclosure. FIG. 1F shows a schematic view of a vector analysis of the output voltage of the inverter on the d-q axes function according to another embodiment of the present disclosure. FIG. 1G shows a schematic view of a vector analysis of the output voltage of the inverter on the d-q axes function according to another embodiment of the present disclosure. FIG. 1H shows a schematic view of a vector analysis of the output voltage of the inverter on the d-q axes function according to another embodiment of the present disclosure. FIG. 1E corresponds to FIG. 1F and FIG. 1G corresponds to FIG. 1H. In some embodiments, the output voltage of the inverter 130 may be obtained by the hardware detecting circuit or digital control command of the software.

In FIG. 1E, FIG. 1F, FIG. 1G and FIG. 1H, $v_s$ is the sum of the three-phase voltage vectors $v_{un}$, $v_{vn}$ and $v_{wn}$, $v_{ds}$ is the d-axis voltage signal and $v_{qs}$ is the q-axis voltage signal. FIG. 1E and FIG. 1F correspond to the relative relationships between the voltage component and the current component in case there is a heavy load on the BLDC motor 160. FIG. 1G and FIG. 1H correspond to the relative relationships between the voltage component and the current component in case there is a light load on the BLDC motor 160. According to FIG. 1E, FIG. 1F, FIG. 1G and FIG. 1H, when the load of the shaft end of the BLDC motor 160 is increased, the d-axis voltage signal $v_{ds}$ ($|v_{ds}|=|v_s|\cdot\sin\theta_2|$) may be decreased (as shown in FIG. 1E and FIG. 1F). When the load of the shaft end of the BLDC motor 160 is decreased, the d-axis voltage signal $v_{ds}$ may be increased (as shown in FIG. 1G and FIG. 1H). That is, the load condition of the shaft end of the BLDC motor 160 may be obtained by observing the change of the d-axis voltage signal $v_{ds}$.

In some embodiments, the control unit may perform the low-pass filter process for the d-axis voltage signal $v_{ds}$ and then performs the integral amplification process for the d-axis voltage signal $v_{ds}$ to generate the processed d-axis voltage signal $v_{ds}$. The control unit 150 determines the load state of the shaft end of the BLDC motor 160 according to the processed d-axis voltage signal $v_{ds}$ and the startup current signal $i_{qs}$.

In addition, in the above embodiment, the control unit 150 determines the load state of the shaft end of the BLDC motor 160 according to the d-axis voltage signal $v_{ds}$ and the startup current signal $i_{qs}$, but the present disclosure is not limited thereto. The control unit 150 may also determine the load state of the shaft end of the BLDC motor 160 according to the q-axis voltage signal $v_{qs}$ and the startup current signal $i_{qs}$. In some embodiments, The control unit 150 may also determine the load state of the shaft end of the BLDC motor 160 according to the d-axis voltage signal $v_{ds}$, the q-axis voltage signal $v_{qs}$ and the startup current signal $i_{qs}$.

Next, the control unit 150 calculates the torque demand of the BLDC motor 160 under different angular velocities and angular accelerations according to the internal parameter electric rotation angular velocity $$\omega_r^* = \frac{d\theta_r^*}{dt}$$

and according to the formula (4) (shown below), $$T_e = T_L + Jd\omega/dt + B\omega, \qquad (4)$$

wherein $T_e$ is the torque outputted by the motor, i.e., a torque demand of the motor for maintaining the particular angular velocity and the particular angular acceleration, $T_L$ is the load torque of the shaft end of the BLDC motor 160, J is the rotor inertia, ω is the angular velocity and B is the frictional force. After the control unit 150 obtains the electric rotation angular velocity $\omega_r^*$ of the BLDC motor and the calculated torque demand $T_e$, the control unit 150 may adaptively adjust the magnitude of the startup current signal $i_{qs}$ of the driving unit 110 according to the current torque demand of the BLDC motor 160. For example, the control unit 150 decreases the magnitude of the startup current signal $i_{qs}$. Therefore, the power loss of the BLDC motor 160 may be effectively decreased in the startup process period of the BLDC motor 160.

The respective elements of the motor control device 100 and the arrangement relationship thereof of the present disclosure have been described above, and the operation of the motor control device 100 may be described below by way of other embodiments.

Figure 2:
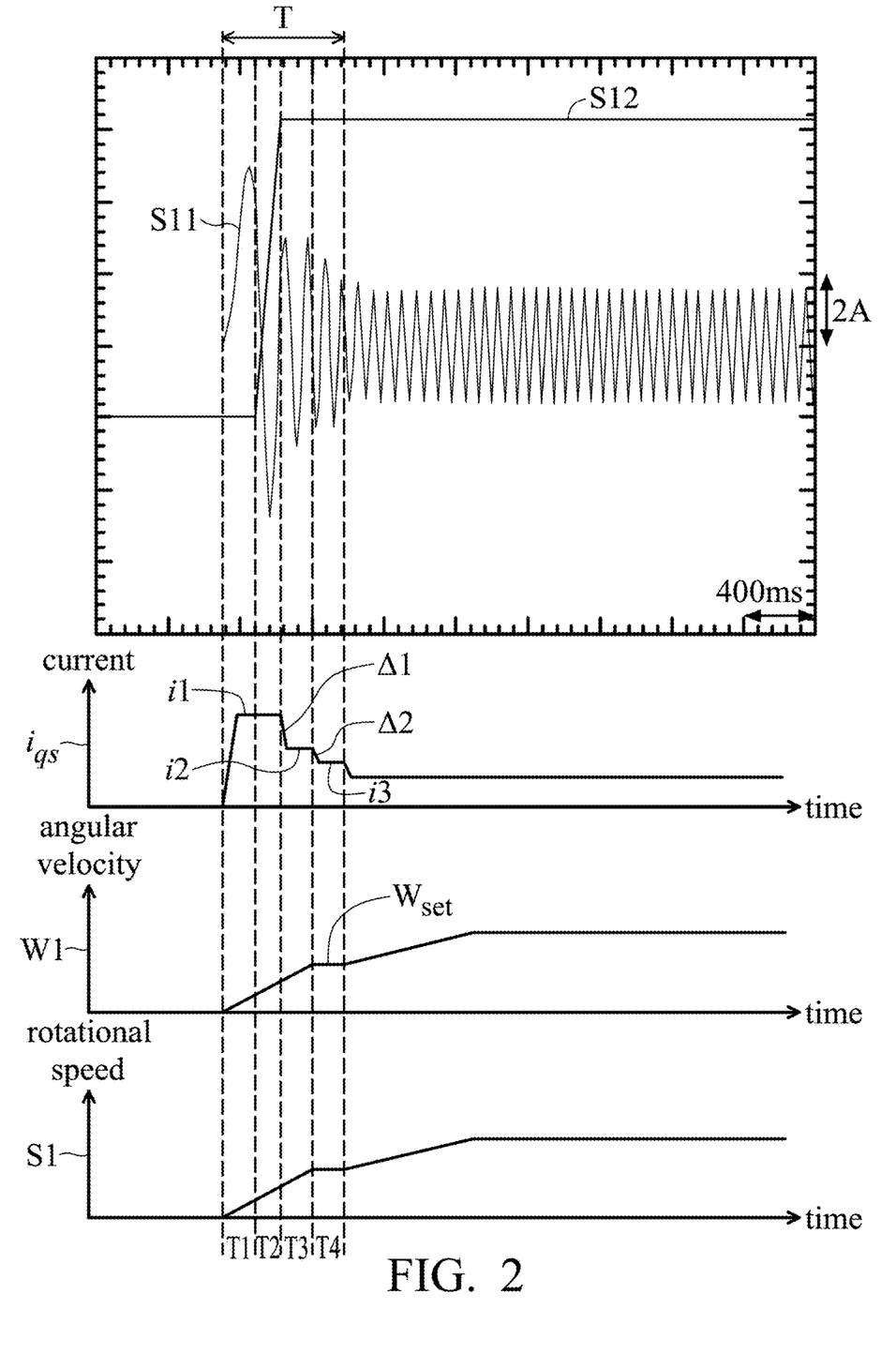
FIG. 2 shows a schematic view of an operation timing of the motor control device according to an embodiment of the present disclosure.

FIG. 2 shows a schematic view of an operation timing of the motor control device according to an embodiment of the present disclosure. Please refer to FIG. 2, the reference number T is the startup process period, i.e., the open-loop controlling stage, and the startup process period T includes periods T1, T2, T3 and T4. The curve S11 indicates the phase current of driving the BLDC motor 160. The curve S12 indicates the load state of the shaft end of the BLDC motor 160 estimated by the present disclosure. $i_{qs}$ is the startup current signal (corresponding to phase current peak value of the BLDC motor 160). W1 is an actual value corresponding to the command of electric rotation angular velocity for providing to the BLDC motor 160. In the periods T1 to T4, the value of W1 is $\omega_r^*$ and in the other periods, W1 is angular velocity command generated by the speed command generator 111. Si is the actual rotational speed of the BLDC motor 160.

In period T1, the control unit 150 provides the startup current signal $i_{qs}$ and increases the startup current signal $i_{qs}$ to the first preset value i1. In addition, the driving unit 110 generate the corresponding driving voltage signal according to the startup current signal $i_{qs}$ with the first predetermined value i1 and the phase current signal. The driving voltage signal is provided to the inverter 130, so that the inverter 130 generates the driving current signal according to the driving voltage signal to drive the BLDC motor 160 to rotate.

In period T2, the actual load state of the shaft end of the BLDC motor 160 analyzed by the above principle may be reflected by the d-axis voltage signal $v_{ds}$ and q-axis voltage signal $v_{qs}$. Accordingly, the control unit 150 may process the d-axis voltage signal $v_{ds}$ or q-axis voltage signal $v_{qs}$. For example, the control unit 150 performs the low-pass filter process and the integral amplification process for the d-axis voltage signal $v_{ds}$ or q-axis voltage signal $v_{qs}$. Then, the control unit 150 obtains the classification information of the load state of the shaft end of the BLDC motor 160 (as shown by the curve S12 in FIG. 2). The classification information may be, for example, light load, middle load or heavy load.

In period T3, the control unit 150 decreases the startup current signal $i_{qs}$ from the first predetermined value i1 to a second predetermined value i2 according to the load state of the shaft end of the BLDC motor 160 (i.e., the load information of the shaft end provided by the curve S12). The decrease slope is, for example, Δ1. An effective value (square root) of the second predetermined value i2 is, for example, 3 A. The effective value (square root) of the first predetermined value i1 is, for example, 4 A. The second predetermined value i2 may be changed according to different load states of the shaft end. For example, the second predetermined value i2 corresponding to light load is less than the second predetermined value i2 corresponding to middle load, and the second predetermined value i2 corresponding to the middle load is also less than the second predetermined value i2 corresponding to the heavy load.

In period T4, when the value W1 corresponding to the electric rotation angular velocity command of providing to the BLDC motor 160 reaches a predetermined angular velocity $W_{set}$ and is maintained at the predetermined angular velocity $W_{set}$ and the BLDC motor 160 synchronously rotate $$\left(s1 = \frac{W_{set}}{2\pi} * 60\right),$$

the rotational speed of the BLDC motor 160 may also maintain the fixed value. At this time, the rotational speed of the BLDC motor 160 maintains the fixed value, J dω/dt in the formula (4) may be zeroed. The frictional force B corresponding to the BLDC motor 160 may be decreased (for example, the decrease of the frictional force) with the increase of the rotational speed of the BLDC motor 160. Accordingly, the control unit 150 may obtain the torque demand corresponding to the BLDC motor 160 through the formula (4) or a lookup table. That is, the torque demand of the BLDC motor 160 may be decreased.

Then, the control unit 150 decrease the startup current signal $i_{qs}$ from the second predetermined value i2 to a third predetermined value i3 according to the torque demand of the BLDC motor 160. The decrease slope is, for example, Δ2. An effective value (square root) of the third predetermined value i3 is, for example, 2 A. Similarly, the third predetermined value i3 may be changed according to different second predetermined values i2.

Figure 3:
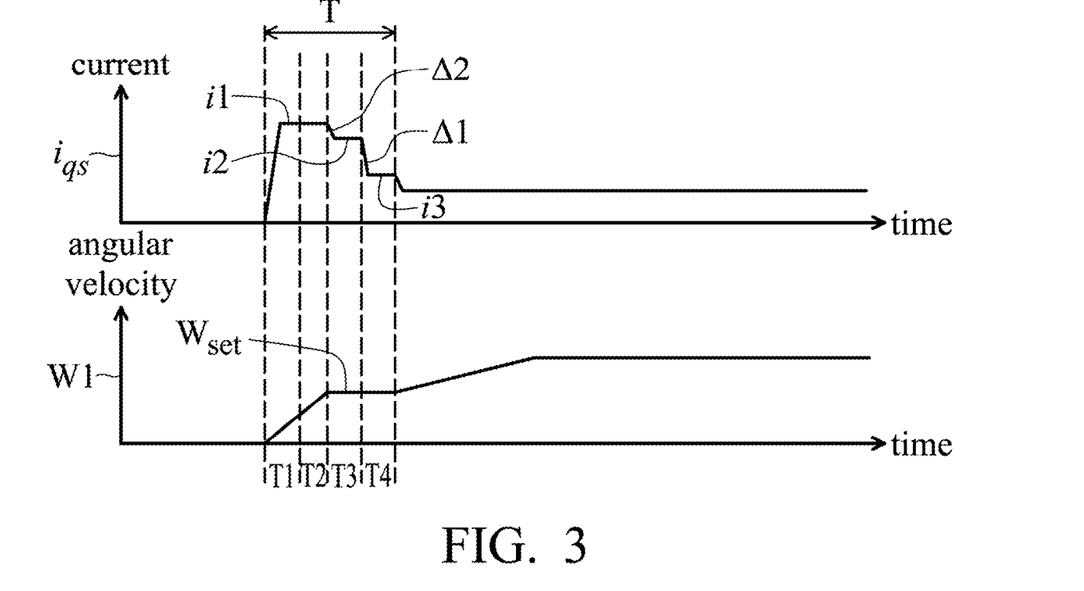
FIG. 3 shows a schematic view of an operation timing of the motor control device according to another embodiment of the present disclosure.

FIG. 3 shows a schematic view of an operation timing of the motor control device according to another embodiment of the present disclosure. In FIG. 3 in the periods T1 and T2 of the startup process period T, the startup current signal $i_{qs}$ and the electric rotation angular velocity W1 of the BLDC motor 160 are substantially similar to that in FIG. 2. The difference between FIG. 3 and FIG. 2 is that in FIG. 3, in period T3 after period T2, when the electric rotation angular velocity W1 of the BLDC motor 160 reaches the predetermined angular velocity $W_{set}$ and is maintained at the predetermined angular velocity $W_{set}$, the rotational speed of the BLDC motor 160 may also maintain the fixed value.

At this time, since the rotational speed of the BLDC motor 160 maintains the fixed value, J dω/dt in the formula (4) will be zeroed. The frictional force B corresponding to the BLDC motor 160 may be decreased (for example, the decrease of the frictional force) with the increase of the rotational speed of the BLDC motor 160. Accordingly, the control unit 150 may obtain the torque demand corresponding to the BLDC motor 160 through the formula (4) or a lookup table. That is, the torque demand of the BLDC motor 160 may be decreased. Then, the control unit 150 decrease the startup current signal $i_{qs}$ from the first predetermined value i1 to the second predetermined value i2 according to the torque demand of the BLDC motor 160. The effective value (square root) of the second predetermined value i2 is, for example, 3 A. The decrease slope is, for example, Δ2.

In period T4, the control unit 150 decreases the startup current signal $i_{qs}$ from the second predetermined value i2 to the third predetermined value i3 according to the load state of the shaft end of the BLDC motor 160 (for example, the curve S12 in FIG. 2). The decrease slope is, for example, Δ1. The effective value (square root) of the third predetermined value i3 is, for example, 2 A. Similarly, the third predetermined value i3 may be changed according to different load states of the shaft end. For example, the second predetermined value i3 corresponding to light load is less than the second predetermined value i3 corresponding to middle load, and the second predetermined value i3 corresponding to the middle load is also less than the second predetermined value i3 corresponding to the heavy load.

Figure 4:
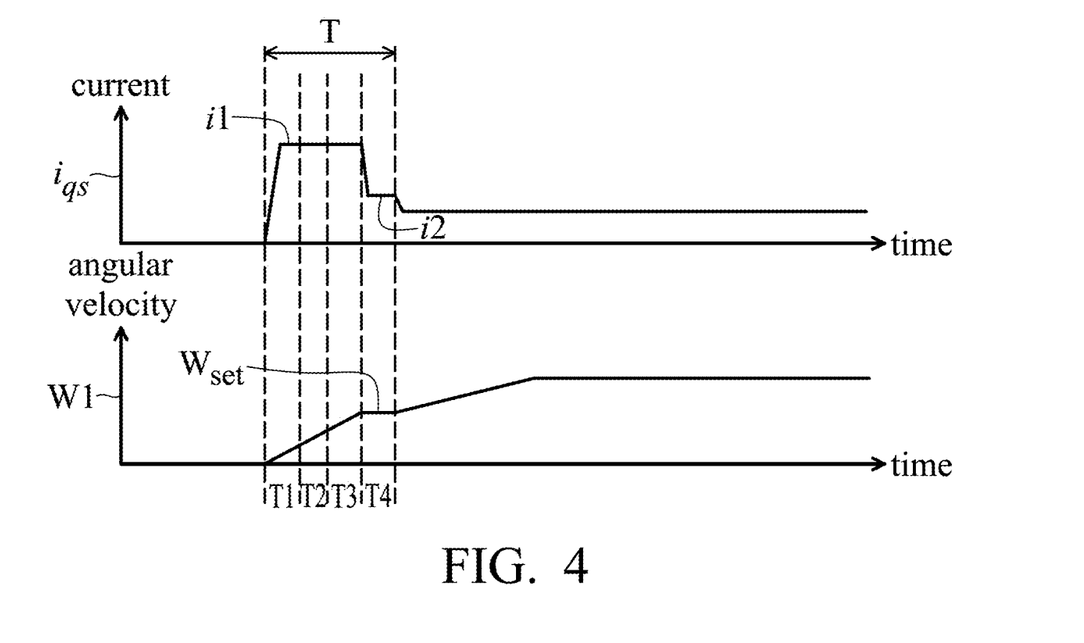
FIG. 4 shows a schematic view of an operation timing of the motor control device according to another embodiment of the present disclosure.

FIG. 4 shows a schematic view of an operation timing of the motor control device according to another embodiment of the present disclosure. In FIG. 4 in the periods T1 and T2 of the startup process period T, the startup current signal $i_{qs}$ and the electric rotation angular velocity W1 of the BLDC motor 160 are substantially similar to that in FIGS. 2 and 3. The difference between FIG. 4 and FIGS. 2 and 3 is that in FIG. 4, in period T3 after period T2, the control unit 150 does not adjust the startup current signal $i_{qs}$. That is, the startup current signal $i_{qs}$ still maintains the first predetermined value i1.

Then, in period T4, when the electric rotation angular velocity W1 of the BLDC motor 160 reaches the predetermined angular velocity $W_{set}$ and is maintained at the predetermined angular velocity $W_{set}$, the rotational speed of the BLDC motor 160 may also maintain the fixed value. Since the rotational speed of the BLDC motor 160 maintains the fixed value and the torque demand of the BLDC motor 160 calculated by the control unit 150 is decreased, the control unit 150 decreases the startup current signal $i_{qs}$ from the first predetermined value i1 to the second predetermined value i2 according to the torque demand of the BLDC motor 160 and the load state of the shaft end of the BLDC motor 160. The effective value of the second predetermined value i2 is, for example, 2 A. Similarly, the second predetermined value i2 may also be adjusted according to different load states of the shaft end.

In some embodiments, in the periods T2 to T4 correspond to FIGS. 2, 3 and 4, the control unit 150 may determine the load state of the shaft end of the BLDC motor 160 according to at least one of the d-axis voltage signal $v_{ds}$ and the q-axis voltage signal $v_{qs}$. Accordingly, the control unit 150 determines whether the load state of the shaft end is a blocked motor state. When the load state of the shaft end is the blocked motor state, the control unit 150 may further increase the startup current signal $i_{qs}$ from the first predetermined value i1, the second predetermined value i2 and the third predetermined value i3 to a fourth predetermined value i4, so that the BLDC motor may normally operate. The fourth predetermined value i4 is, for example, the maximum current allowed by the BLDC motor 160, and an effective value of the maximum current is, for example, 5 A. In the embodiment, the adjustment manner of the startup current signal $i_{qs}$ is that the first predetermined value it is increased to the fourth predetermined value i4 according to an increasing slope, but the value of the increasing slope is not limited thereto.

According to the above embodiments, in the startup process period of the BLDC motor 160, the device controlling unit 100 of the embodiment may adaptively decrease the magnitude of the startup current signal according to the load state of the shaft end, the electric rotation angular velocity and torque demand of the BLDC motor 160. Therefore, the situation that the continuous large startup current signal is provided to drive the BLDC motor 160 to operate resulted in increasing the power loss may be avoided, thereby effectively decreasing the power loss of the BLDC motor 160 in the startup process period.

In the above embodiments, the motor control device 100 is adapted to drive the BLDC motor 160, in particular to a sensorless BLDC motor 160, but the present disclosure is not limit thereto. The motor control device 100 of the embodiment may also be adapted to drive an interior permanent magnet synchronous motor (IPMSM), and the operation of the motor control device 100 may refer to the description of the above embodiments and motor control device 100 may still achieve the same control effect.

In addition, the first predetermined value is exemplified by setting in advance, but the present disclosure is not limited thereto. When the difference of the startup load of the BLDC motor 160 is not large, the control unit 150 may also set the first predetermined value according to the information of at least one of the d-axis voltage signal $v_{ds}$ and q-axis voltage signal $v_{qs}$ obtained in the previous startup process period T.

Figure 5:
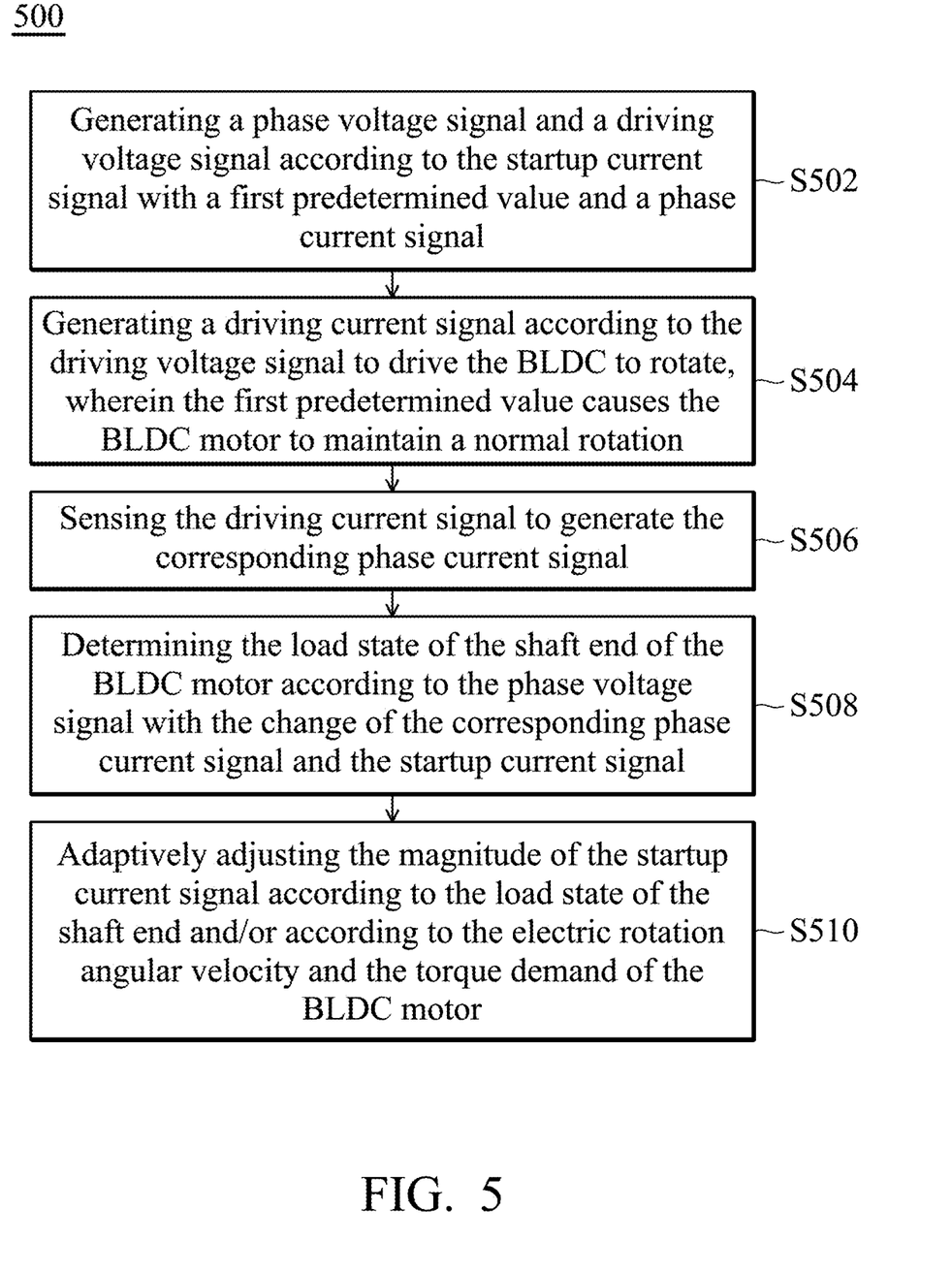
FIG. 5 shows a flowchart of a motor control method according to an embodiment of the present disclosure.

FIG. 5 shows a flowchart of a motor control method 500 according to an embodiment of the present disclosure. The motor control method 500 of the embodiment is adapted for the startup process of a sensorless BLDC motor. In step S502, the method involves generating a phase voltage signal and a driving voltage signal according to the startup current signal with a first predetermined value and a phase current signal. In step S504, the method involves generating a driving current signal according to the driving voltage signal to drive the BLDC to rotate, wherein the first predetermined value causes the BLDC motor to maintain a normal rotation. In step S506, the method involves sensing the driving current signal to generate the corresponding phase current signal. In step S508, the method involves determining the load state of the shaft end of the BLDC motor according to the phase voltage signal with the change of the corresponding phase current signal (for example, at least one of d-axis voltage signal and q-axis voltage signal) and the startup current signal. In step S510, the method involves adaptively adjusting the magnitude of the startup current signal according to the load state of the shaft end and/or according to the electric rotation angular velocity and the torque demand of the BLDC motor. In other words, in some embodiments, the method may only involve directly adjusting the startup signal according to the determined load state of the shaft end. In some embodiments, the method may only involve directly adjusting the startup signal according to the electric rotation angular velocity and the torque demand of the BLDC motor. In some embodiments, the method may optionally involve adjusting the startup current according to the load state of the shaft end and according to the electric rotation angular velocity and the torque demand of the BLDC motor in different stages. In the embodiment, the torque demand includes a load torque, a motor inertia and a frictional force.

Figure 6:
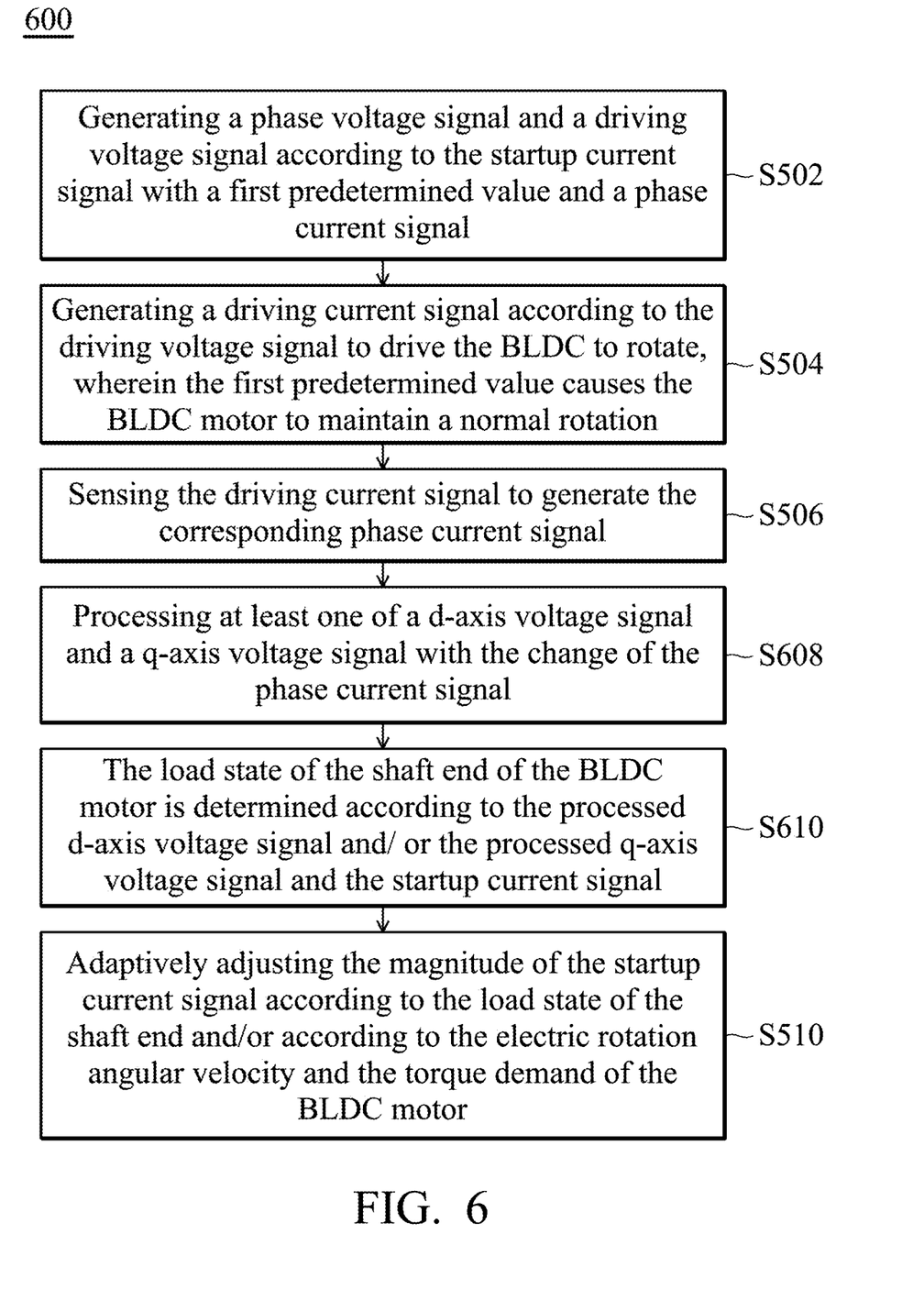
FIG. 6 shows a flowchart of a motor control method according to another embodiment of the present disclosure.

FIG. 6 shows a flowchart of a motor control method 600 according to another embodiment of the present disclosure. The motor control method 600 of the embodiment is similar to the motor control method 500. In the embodiment, the motor control method 600 includes the steps S502 to S506 and step S510 in the motor control method 500 and also includes steps S608 to S610. In the step S608, the method involves processing at least one of a d-axis voltage signal and a q-axis voltage signal with the change of the phase current signal, such as a low pass filter process and an integral amplification process. Then, the load state of the shaft end of the BLDC motor is determined according to the processed d-axis voltage signal and/or the processed q-axis voltage signal and the startup current signal (for example, the step S610).

Figure 7:
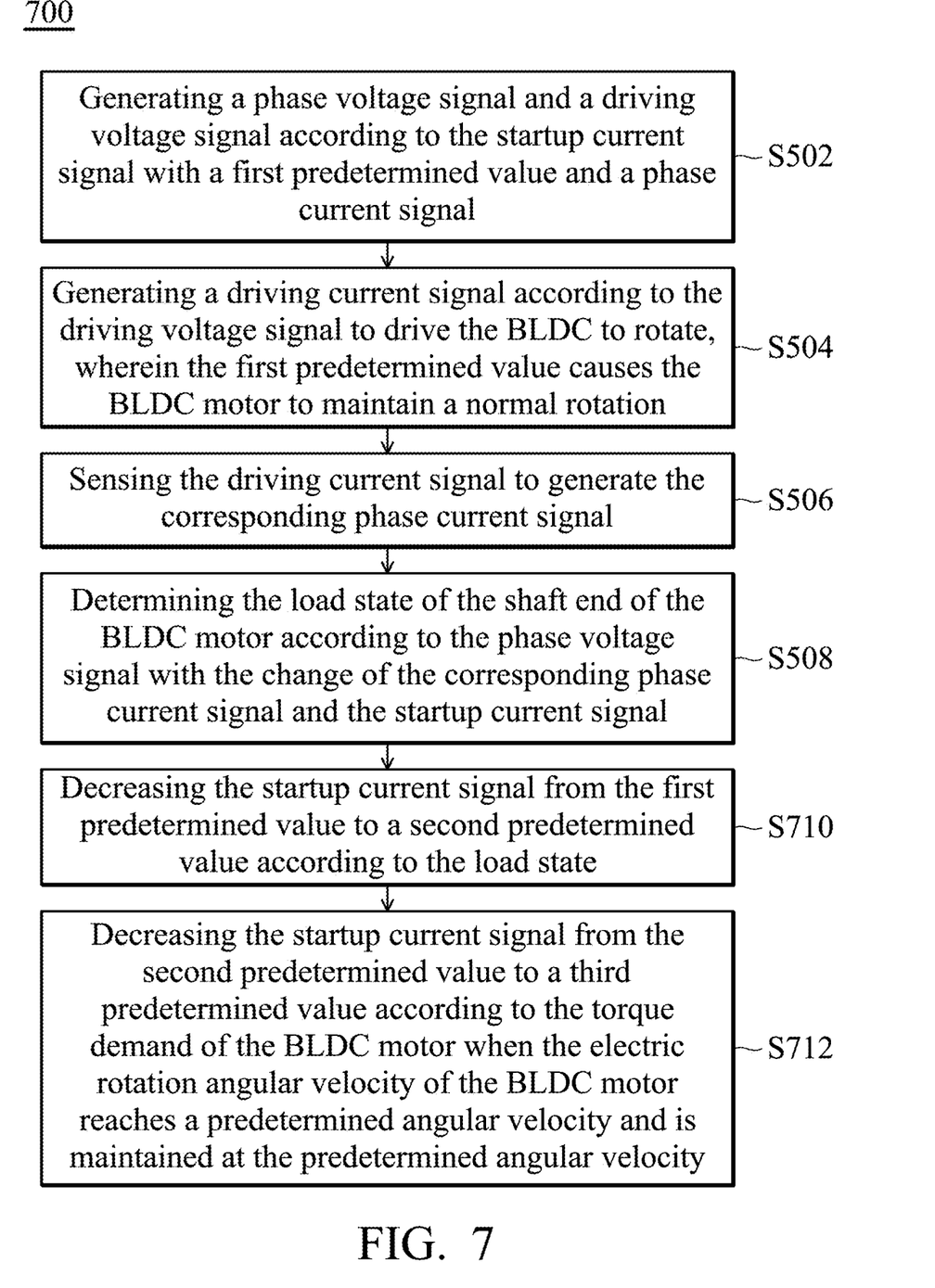
FIG. 7 shows a flowchart of a motor control method according to another embodiment of the present disclosure.

FIG. 7 shows a flowchart of a motor control method 700 according to another embodiment of the present disclosure. The motor control method 700 of the embodiment is similar to the motor control method 500. In the embodiment, the motor control method 700 includes the steps S502 to S508 in the motor control method 500 and also includes steps S710 to S712. In the step S710, the method involves decreasing the startup current signal from the first predetermined value to a second predetermined value according to the load state. In some embodiments, the method may optionally execute the step S712. In the step S712, the method involves decreasing the startup current signal from the second predetermined value to a third predetermined value according to the torque demand of the BLDC motor when the electric rotation angular velocity of the BLDC motor reaches a predetermined angular velocity and is maintained at the predetermined angular velocity.

Figure 8:
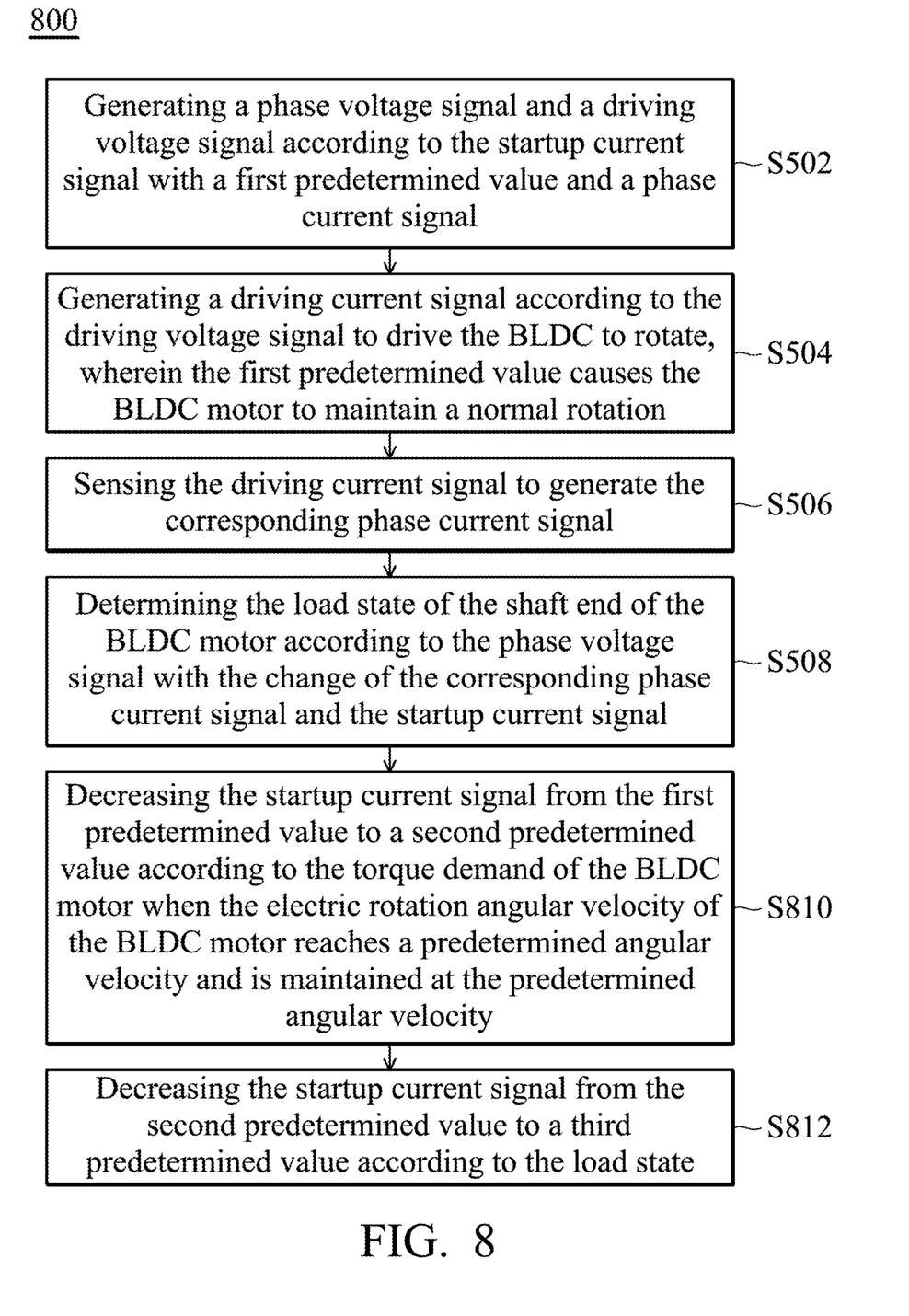
FIG. 8 shows a flowchart of a motor control method according to another embodiment of the present disclosure.

FIG. 8 shows a flowchart of a motor control method 800 according to another embodiment of the present disclosure. The motor control method 800 of the embodiment is similar to the motor control method 700. The difference between the motor control method 800 and the motor control method 700 is that steps S810 to S812 are different from the steps S710 to S712. In the step S810, the method involves decreasing the startup current signal from the first predetermined value to a second predetermined value according to the torque demand of the BLDC motor when the electric rotation angular velocity of the BLDC motor reaches a predetermined angular velocity and is maintained at the predetermined angular velocity. In some embodiments, the method may optionally execute the step S812. In the step S812, the method involves decreasing the startup current signal from the second predetermined value to a third predetermined value according to the load state.

Figure 9:
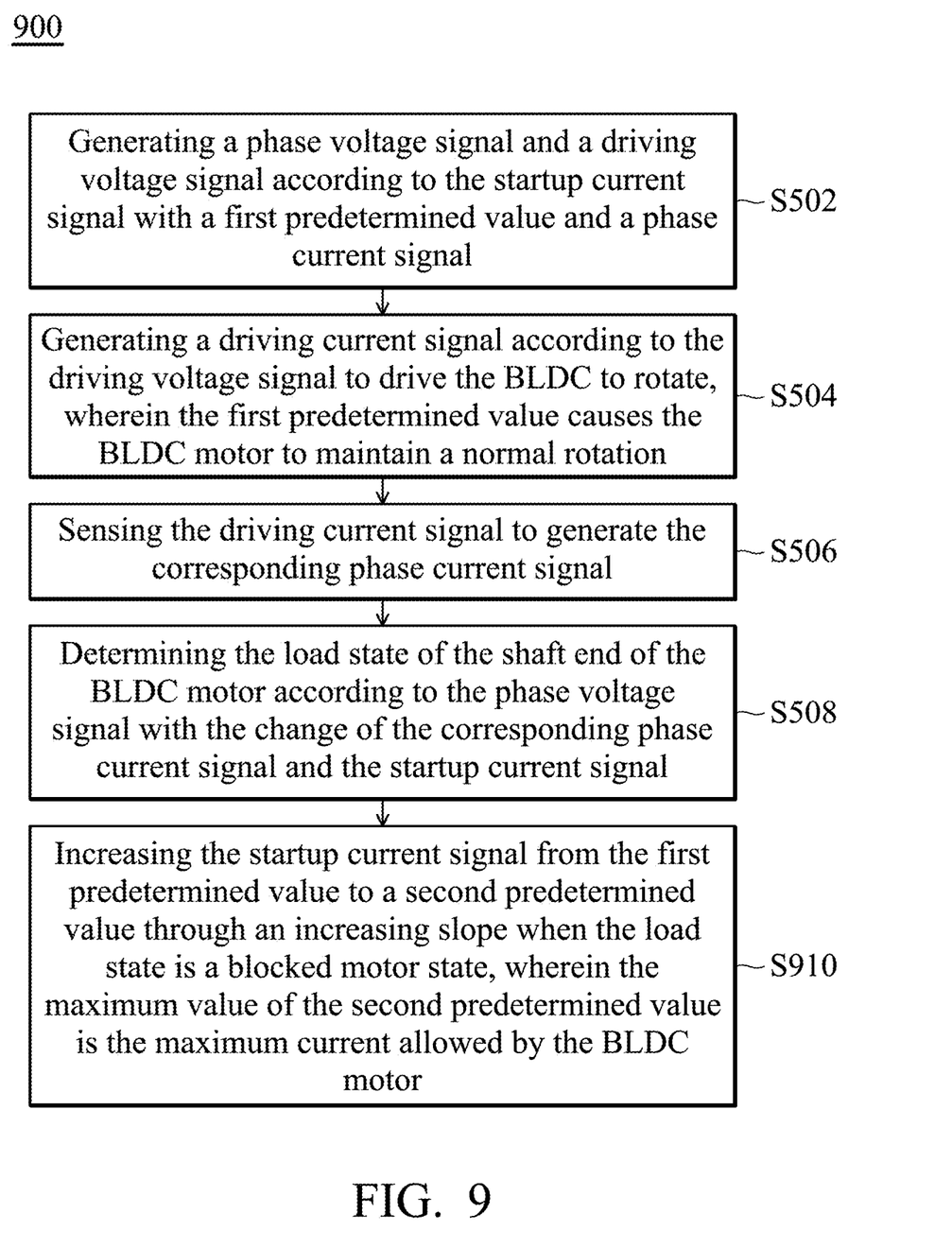
FIG. 9 shows a flowchart of a motor control method according to another embodiment of the present disclosure.

FIG. 9 shows a flowchart of a motor control method 900 according to another embodiment of the present disclosure. The motor control method 900 of the embodiment is similar to the motor control method 500. In the embodiment, the motor control method 900 includes the steps S502 to S508 in the motor control method 500 and also includes step S910. In the step S910, the method involves increasing the startup current signal from the first predetermined value to a second predetermined value through an increasing slope when the load state is a blocked motor state, wherein the maximum value of the second predetermined value is the maximum current allowed by the BLDC motor. In some embodiments, the slope may be adjusted according to actual requirements to adjust the increase amplitude of the starting current signal.

In summary, according to the motor control method and device, the phase voltage signal (such as the d-axis voltage signal and the q-axis voltage) and the driving voltage signal are generated according to the startup current signal with the first predetermined value and the phase current signal. The driving current signal is generated according to the driving voltage signal to drive the BLDC motor to operate. The load state of the shaft end of the BLDC motor is determined according to at least one of the d-axis voltage signal and the q-axis voltage signal with the change of the phase current signal. The magnitude of the startup current signal is adaptively adjusted according to the load state of the shaft end and/or the electric rotation angular velocity and torque demand of the BLDC motor. Therefore, the situation of increasing the power loss resulted from providing the larger startup current to drive the BLDC motor may be avoided, thereby effectively decreasing the power loss of the BLDC motor in the startup process period.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motor control method adapted for a startup process for a brushless DC (BLDC) motor, the motor control method comprising:
    (a) generating a phase voltage signal and a driving voltage signal according to a startup current signal with a first predetermined value and a phase current signal;
    (b) generating a driving current signal according to the driving voltage signal to drive the BLDC motor to rotate, wherein the first predetermined value causes the BLDC motor to maintain a normal rotation;
    (c) sensing the driving current signal to correspondingly generate the phase current signal;
    (d) determining a load state of a shaft end of the BLDC motor according to the phase voltage signal and the startup current signal, wherein the phase voltage signal correspondingly changes with the phase current signal; and
    (e) adaptively adjusting a magnitude of the startup current signal according to the load state of the shaft end and/or according to an electric rotation angular velocity and a torque demand of the BLDC motor.

2. The motor control method as claimed in claim 1, wherein the phase voltage signal comprises at least one of a d-axis voltage signal and a q-axis voltage signal.

3. The motor control method as claimed in claim 1, wherein step (e) comprises:
    decreasing the startup current signal from the first predetermined value to a second predetermined value according to the load state.

4. The motor control method as claimed in claim 3, wherein step (e) further comprises:
    decreasing the startup current signal from the second predetermined value to a third predetermined value according to the torque demand of the BLDC motor when the electric rotation angular velocity of the BLDC motor reaches a predetermined angular velocity and is maintained at the predetermined angular velocity.

5. The motor control method as claimed in claim 1, wherein step (e) comprises:
    decreasing the startup current signal from the first predetermined value to a second predetermined value according to the torque demand of the BLDC motor when the electric rotation angular velocity of the BLDC motor reaches a predetermined angular velocity and is maintained at the predetermined angular velocity.

6. The motor control method as claimed in claim 5, wherein step (e) further comprises:
    decreasing the startup current signal from the second predetermined value to a third predetermined value according to the load state.

7. The motor control method as claimed in claim 1, wherein step (e) comprises:
    increasing the startup current signal from the first predetermined value to a second predetermined value when the load state is a blocked motor state, wherein a maximum value of the second predetermined value is the value of a maximum current allowed by the BLDC motor.

8. The motor control method as claimed in claim 1, wherein step (d) comprises:
    performing a low-pass filter process and an integral amplification process for the phase voltage signal to generate a processed phase voltage signal; and;
    determining the load state of the shaft end of the BLDC motor according to the processed phase voltage signal and the startup current signal.

9. The motor control method as claimed in claim 1, wherein the first predetermined value is set according to the phase voltage signal obtained in the period of the previous startup process executed for the BLDC motor.

10. A motor control device adapted for a startup process for a brushless DC (BLDC) motor, the motor control device comprising:
    a driving unit, generating a phase voltage signal and a driving voltage signal according to a startup current signal with a first predetermined value and a phase current signal;
    an inverter, generating a driving current signal according to the driving voltage signal to drive the BLDC motor to rotate, wherein the first predetermined value causes the BLDC motor to maintain a normal rotation;
    a sensing unit, sensing the driving current signal of the inverter to correspondingly generate the phase current signal; and
    a control unit, providing the startup current signal, determining a load state of a shaft end of the BLDC motor according to the phase voltage signal and the startup current signal, and adaptively adjusting a magnitude of the startup current signal according to the load state of the shaft end and/or according to an electric rotation angular velocity and a torque demand of the BLDC motor, wherein the phase voltage signal correspondingly changes with the phase current signal.

11. The motor control device as claimed in claim 10, wherein the phase voltage signal comprises at least one of a d-axis voltage signal and a q-axis voltage signal.

12. The motor control device as claimed in claim 10, wherein the control unit further decreases the startup current signal from the first predetermined value to a second predetermined value according to the load state.

13. The motor control device as claimed in claim 12, wherein the control unit further decreases the startup current signal from the second predetermined value to a third predetermined value according to the torque demand of the BLDC motor when the electric rotation angular velocity of the BLDC motor reaches a predetermined angular velocity and is maintained at the predetermined angular velocity.

14. The motor control device as claimed in claim 10, wherein the control unit further decreases the startup current signal from the first predetermined value to a second predetermined value according to the torque demand of the BLDC motor when the electric rotation angular velocity of the BLDC motor reaches a predetermined angular velocity and is maintained at the predetermined angular velocity.

15. The motor control device as claimed in claim 14, wherein the control unit further decreases the startup current signal from the second predetermined value to a third predetermined value according to the load state.

16. The motor control device as claimed in claim 10, wherein the control unit further increases the startup current signal from the first predetermined value to a second predetermined value when the load state is a blocked motor state, wherein the maximum value of the second predetermined value is the value of a maximum current allowed by the BLDC motor.

17. The motor control device as claimed in claim 10, wherein the control unit further performs a low-pass filter process and an integral amplification process for the phase voltage signal to generate a processed phase voltage signal, and determines the load state of the shaft end of the BLDC motor according to the processed phase voltage signal and the startup current signal.

18. The motor control device as claimed in claim 10, wherein the first predetermined value is set according to the phase voltage signal obtained in the period of the previous startup process executed for the BLDC motor.

* * * * *